US011968568B2

(12) United States Patent
Yao et al.

(10) Patent No.: US 11,968,568 B2
(45) Date of Patent: Apr. 23, 2024

(54) PERFORMANCE MEASUREMENTS IN A NEXT GENERATION RADIO ACCESS NETWORK (NG-RAN)

(71) Applicant: APPLE INC., Cupertino, CA (US)

(72) Inventors: Yizhi Yao, Chandler, AZ (US); Joey Chou, Scottsdale, AZ (US)

(73) Assignee: APPLE INC., Cupertino, CA (US)

( * ) Notice: Subject to any disclaimer, the term of this patent is extended or adjusted under 35 U.S.C. 154(b) by 369 days.

(21) Appl. No.: 17/276,999

(22) PCT Filed: Sep. 25, 2019

(86) PCT No.: PCT/US2019/053021
§ 371 (c)(1),
(2) Date: Mar. 17, 2021

(87) PCT Pub. No.: WO2020/069032
PCT Pub. Date: Apr. 2, 2020

(65) Prior Publication Data
US 2022/0030475 A1 Jan. 27, 2022

Related U.S. Application Data

(60) Provisional application No. 62/736,748, filed on Sep. 26, 2018.

(51) Int. Cl.
*H04W 36/00* (2009.01)
*H04W 28/02* (2009.01)

(52) U.S. Cl.
CPC ... *H04W 36/0058* (2018.08); *H04W 28/0268* (2013.01); *H04W 36/0016* (2013.01); *H04W 36/0079* (2018.08)

(58) Field of Classification Search
CPC ......... H04W 36/0058; H04W 28/0268; H04W 36/0016; H04W 36/0079; H04W 36/0085; H04W 24/08; H04W 76/18
See application file for complete search history.

(56) References Cited

U.S. PATENT DOCUMENTS

2013/0258890 A1 10/2013 Li et al.
2014/0329528 A1* 11/2014 Zhao ................. H04W 24/08
455/436

(Continued)

OTHER PUBLICATIONS

3GPP TS 32.425, "3rd Generation Partnership Project; Technical Specification Group Services and System Aspects; telecommunication management; Performance Management (PM); Performance measurements Evolved Universal terrestrial Radio Access Network (E-UTRAN) (Release 15)", V15.1.0, Jun. 2018, 93 pages (Year: 2018).*

(Continued)

*Primary Examiner* — Jinsong Hu
*Assistant Examiner* — Farideh Madani
(74) *Attorney, Agent, or Firm* — Dorsey & Whitney LLP

(57) ABSTRACT

Technology for a service producer of a Next Generation NodeB (gNB) operable to generate performance measurements in a Next Generation radio access network (NG-RAN) is disclosed. The service producer can decode raw performance measurements 5 received from a plurality of gNBs. The service producer can generate performance measurements related to at least one of an inter-gNB handover or a protocol data unit (PDU) session resource setup for the plurality of gNBs based on the raw performance measurements.

20 Claims, 10 Drawing Sheets

(56) References Cited

U.S. PATENT DOCUMENTS

2015/0289176 A1* 10/2015 Liu .................. H04W 24/02
370/331
2018/0262924 A1* 9/2018 Dao .................. H04W 24/02

OTHER PUBLICATIONS

3GPP TS 28.552, "3rd Generation Partnership Project; Technical Specification Group Services and System Aspects; Management and orchestration; 5G performance measurements (Release 15)", V15.0.0, Sep. 2018, 39 pages (Year: 2018).*
3GPP TS 28.533, "3rd Generation Partnership Project; Technical Specification Group Services and System Aspects; Management and orchestration; Architecture framework (Release 15)", V15.0.0, Sep. 2018, 23 pages.
3GPP TS 28.552, "3rd Generation Partnership Project; Technical Specification Group Services and System Aspects; Management and orchestration; 5G performance measurements (Release 15)", V15.0.0, Sep. 2018, 39 pages.
3GPP TS 32.425, "3rd Generation Partnership Project; Technical Specification Group Services and System Aspects; Telecommunication management; Performance Management (PM); Performance measurements Evolved Universal Terrestrial Radio Access Network (E-UTRAN) (Release 15)", V15.1.0, Jun. 2018, 93 pages.
PCT/US2019/053021, International Search Report and Written Opinion, dated Jan. 16, 2020, 8 pages.

* cited by examiner

PERFORMANCE MEASUREMENTS IN A NEXT GENERATION RADIO ACCESS NETWORK (NG-RAN)

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
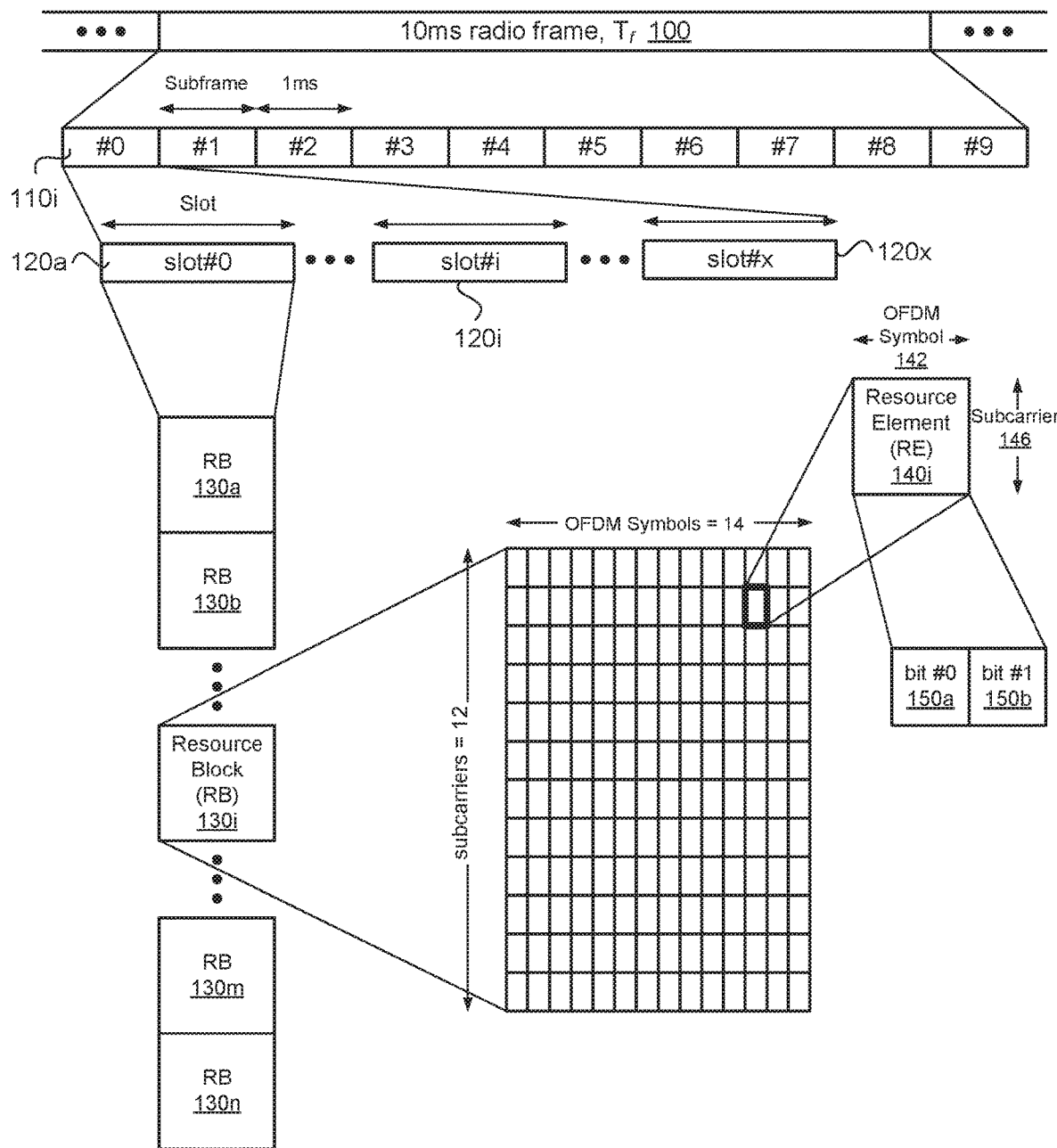
FIG. 1 illustrates a block diagram of a Third-Generation Partnership Project (3GPP) New Radio (NR) Release 15 frame structure in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch®, or other type computing device that provides text or voice communication. The term "User Equipment (UE)" may also be referred to as a "mobile device," "wireless device," of "wireless mobile device."

As used herein, the term "Base Station (BS)" includes "Base Transceiver Stations (BTS)," "NodeBs," "evolved NodeBs (eNodeB or eNB)," "New Radio Base Stations (NR BS) and/or "next generation NodeBs (gNodeB or gNB)," and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP).

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 provides an example of a 3GPP NR Release 15 frame structure. In particular, FIG. 1 illustrates a downlink radio frame structure. In the example, a radio frame 100 of a signal used to transmit the data can be configured to have a duration, $T_f$, of 10 milliseconds (ms). Each radio frame can be segmented or divided into ten subframes 110$i$ that are each 1 ms long. Each subframe can be further subdivided into one or multiple slots 120$a$, 120$i$, and 120$x$, each with a duration, $T_{slot}$, of 1/μ ms, where μ=1 for 15 kHz subcarrier spacing, μ=2 for 30 kHz, μ=4 for 60 kHz, μ=8 for 120 kHz, and u=16 for 240 kHz. Each slot can include a physical downlink control channel (PDCCH) and/or a physical downlink shared channel (PDSCH).

Each slot for a component carrier (CC) used by the node and the wireless device can include multiple resource blocks (RBs) 130$a$, 130$b$, 130$i$, 130$m$, and 130$n$ based on the CC frequency bandwidth. The CC can have a carrier frequency having a bandwidth. Each slot of the CC can include downlink control information (DCI) found in the PDCCH. The PDCCH is transmitted in control channel resource set (CORESET) which can include one, two or three Orthogonal Frequency Division Multiplexing (OFDM) symbols and multiple RBs.

Each RB (physical RB or PRB) can include 12 subcarriers (on the frequency axis) and 14 orthogonal frequency-division multiplexing (OFDM) symbols (on the time axis) per slot. The RB can use 14 OFDM symbols if a short or normal cyclic prefix is employed. The RB can use 12 OFDM symbols if an extended cyclic prefix is used. The resource block can be mapped to 168 resource elements (REs) using short or normal cyclic prefixing, or the resource block can be mapped to 144 REs (not shown) using extended cyclic prefixing. The RE can be a unit of one OFDM symbol 142 by one subcarrier (i.e., 15 kHz, 30 kHz, 60 kHz, 120 kHz, and 240 kHz) 146.

Each RE 140*i* can transmit two bits 150*a* and 150*b* of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

This example of the 3GPP NR Release 15 frame structure provides examples of the way in which data is transmitted, or the transmission mode. The example is not intended to be limiting. Many of the Release 15 features will evolve and change in the 5G frame structures included in 3GPP LTE Release 15, MulteFire Release 1.1, and beyond. In such a system, the design constraint can be on co-existence with multiple 5G numerologies in the same carrier due to the coexistence of different network services, such as eMBB (enhanced Mobile Broadband), mMTC (massive Machine Type Communications or massive IoT) and URLLC (Ultra Reliable Low Latency Communications or Critical Communications). The carrier in a 5G system can be above or below 6 GHz. In one embodiment, each network service can have a different numerology.

In one example, a protocol data unit (PDU) session resource setup procedure in a Next Generation radio access network (NG-RAN) is to assign resources on Uu and NG-U interfaces for one or several PDU session resources and corresponding quality of service (QoS) flows, and to setup corresponding data radio bearers (DRBs) for a given UE. A failed PDU session resource setup may directly cause a service failure for an end user, so performance measurements related to the PDU session resource setup procedure for a gNB are desired. Mobility is one of the most significant features of the mobile networks, and handover is one typical action of the mobility. A handover failure would cause service discontinuation, thus the performance of the handover has direct impact to the user experience. The handover occurs intra-gNB or inter-gNB for 5G networks, and for the inter-gNB case, the handover could happen via the NG or Xn interface. Therefore, it is desirable to monitor the performance of inter-gNB handovers.

The technology described herein relates to performance measurements related to handover and a PDU session resource setup in a NG-RAN. The performance measurements for handovers and PDU session resource setup can be essential for monitoring the performance of the NG-RAN.

Figure 2:
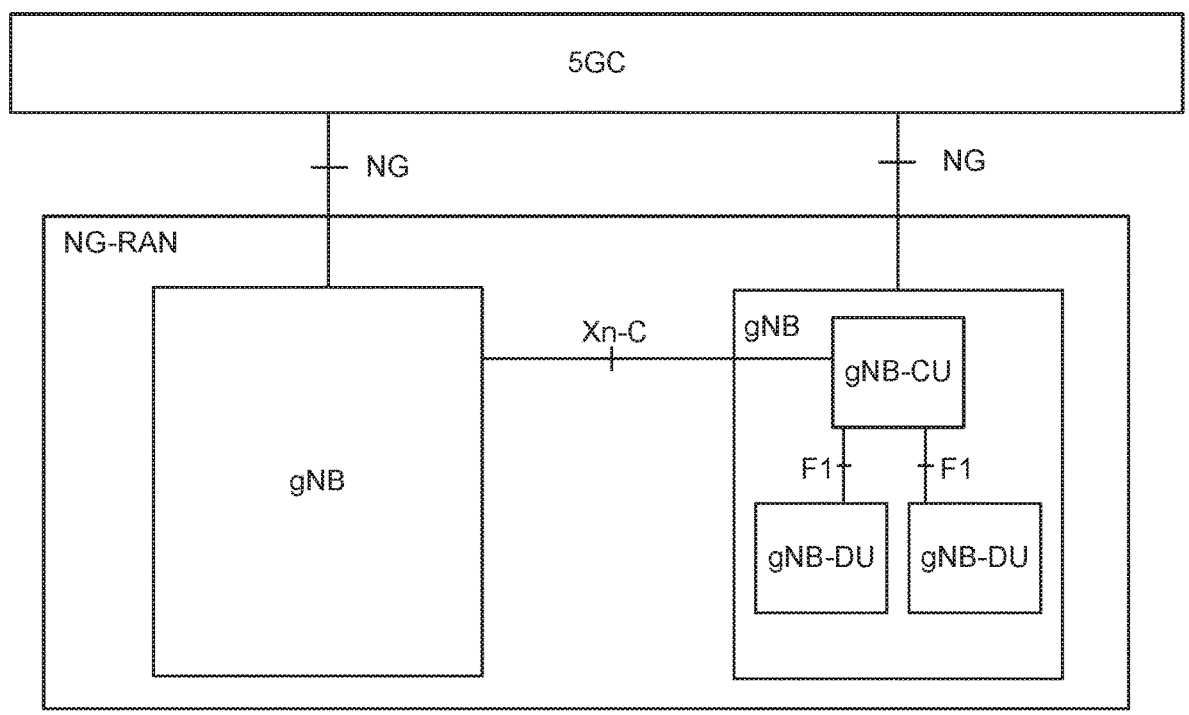
FIG. 2 illustrates a Next Generation radio access network (NG-RAN) architecture in accordance with an example.

FIG. 2 illustrates an example of a Next Generation radio access network (NG-RAN) architecture. ANG-RAN can communicate with a 5G core network (5GC) via an NG interface. The NG-RAN can include a plurality of gNBs. The gNBs can communicate with each other via an Xn-C interface. A given gNB can include a gNB central unit (gNB-CU) and one or more gNB distributed units (gNB-DUs). The gNB-CU of the gNB can communicate with the 5GC via the NG interface. The one or more gNB-DUs can communicate with the gNB-CU via an F1 interface.

Figure 3:
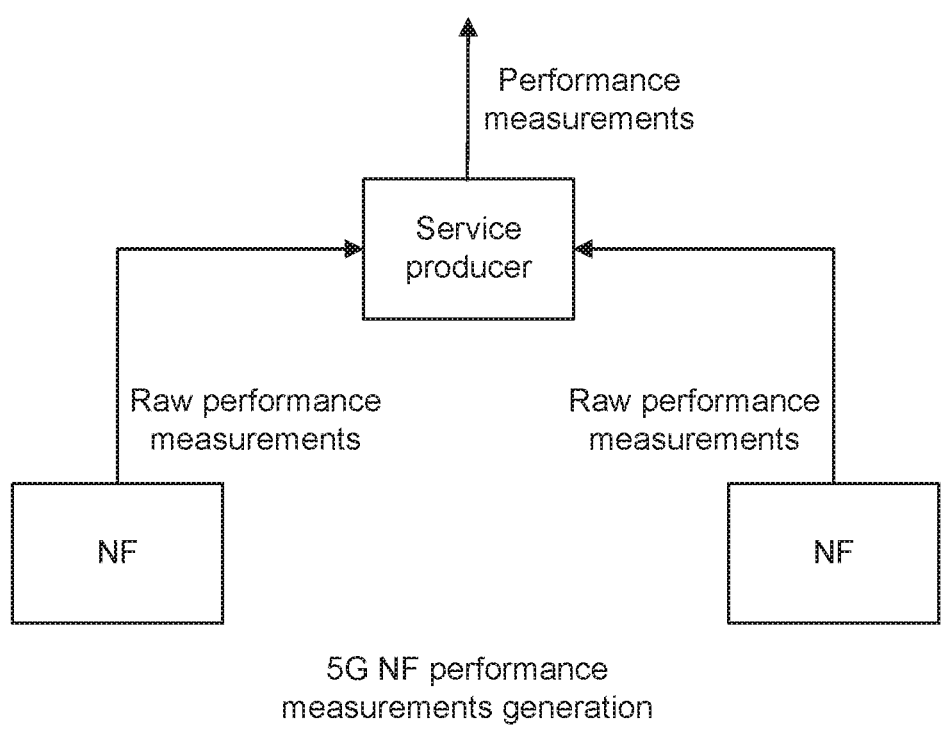
FIG. 3 illustrates a Fifth Generation (5G) network function (NF) performance measurements generation technique in accordance with an example.

FIG. 3 illustrates an example of a Fifth Generation (5G) network function (NF) performance measurements generation technique. For example, a service producer can generate or collect raw performance measurements from one or more NFs. The service provider can generate performance measurements for the NFs based on the raw performance measurements for the service producer's consumers. The raw performance measurements can include unprocessed data or source data received from the one or more NFs.

In one configuration, mobility is one of the most significant features of the mobile networks, and handover is one typical action of the mobility. A handover failure can cause service discontinuation, thus the performance of the handover can have a direct impact to the user experience.

In one example, a handover procedure can include handover preparation, handover resource allocation and handover execution. Further, a performance related to handover can be monitored for each phase. The resources (e.g., PDU session resource) need to be prepared and allocated for a handover according to QoS requirements for each network slice instance (NSI) identifier, such as single network slice selection assistance information (S-NSSAI). Further, the handover can be intra-gNB or inter-gNB for 5G networks, and for the inter-gNB case, the handover can happen via the NG or Xn interface. For the handover failures, measurements with specific causes are necessitated for trouble shooting.

Monitoring of PDU Session Resource Setup in NG-RAN

In one example, a PDU session resource setup procedure in NG-RAN can be used to assign resources on Uu and NG-U for one or several PDU session resources and the corresponding QoS flows, and to setup corresponding Data Radio Bearers for a given UE.

In one example, the PDU session resource setup is an important procedure to allocate resources in the NG-RAN to the UE per the QoS specifications. Whether or not the PDU session resource is successfully setup according to the QoS specifications has direct impact to the user experience. The failed PDU session resource setup can directly cause the service failure for an end user. So, the performance related to the PDU session resource setup for the gNB is to be monitored.

Inter-gNB Handovers Via NG Interface

In one example, a first measurement is a number of requested handover preparations. This measurement can provide the number of handover preparations requested by the source gNB via the NG interface. Further, the first measurement can be on transmission of a HANDOVER REQUIRED message by the gNB to an access management function (AMF) for requesting the preparation of resources at the target gNB.

In one example, a second measurement is a number of successful handover preparations. This measurement can provide the number of successful handover preparations received by the source gNB via the NG interface. Further, the second measurement can be on receipt of a HANDOVER COMMAND message by the gNB from the AMF for informing that the resources for the handover have been prepared at the target gNB.

In one example, a third measurement is a number of failed handover preparations. This measurement can provide the number of failed handover preparations received by the source gNB via the NG interface. This measurement can be split into subcounters per failure cause. Further, the third measurement can be on receipt of a HANDOVER PREPA- RATION FAILURE message by the gNB from the AMF for informing that the preparation of resources at the target gNB has failed. Each received HANDOVER PREPARATION FAILURE message can increment the relevant subcounter per failure cause by 1. Further, each subcounter is an integer value, and where the cause identifies the failure cause of the handover preparations.

In one example, a fourth measurement is a number of requested handover resource allocations. This measurement can provide the number of handover resource allocation requests received by the target gNB via the NG interface. Further, the fourth measurement can be on receipt of a HANDOVER REQUEST message by the gNB from the AMF for requesting the preparation of resources for handover.

In one example, a fifth measurement is a number of successful handover resource allocations. This measurement can provide the number of successful handover resource allocations at the target gNB for the handover via the NG interface. Further, the fifth measurement can be on transmission of a HANDOVER REQUEST ACKNOWLEDGE message by the gNB to the AMF for informing that the resources for the handover have been prepared.

In one example, a sixth measurement is a number of failed handover resource allocations. This measurement can provide the number of failed handover resource allocations at the target gNB for the handover via NG interface. This measurement can be split into subcounters per failure cause. Further, the sixth measurement can be on transmission of a HANDOVER FAILURE message by the gNB to the AMF for informing that the preparation of resources has failed. Each transmitted HANDOVER FAILURE message increments the relevant subcounter per failure cause by 1.

In one example, the measurements described herein can include or be associated with a CC, a single integer value, a NR cell CU, and SGS. Further, the measurements described herein can be a single integer value, and can be valid for packet switched traffic. Further, the measurements described can be used for performance assurance.

Inter-gNB Handovers Via Xn Interface

In one example, a first measurement is a number of requested handover preparations. This measurement can provide the number of handover preparations requested by the source gNB via the Xn interface. Further, the first measurement can be on transmission of a HANDOVER REQUEST message by the source gNB to the target gNB for requesting the preparation of resources at the target gNB.

In one example, a second measurement is a number of successful handover preparations. This measurement can provide the number of successful handover preparations received by the source gNB via the Xn interface. Further, the second measurement can be on receipt of a HANDOVER REQUEST ACKNOWLEDGE message by the source gNB from the target gNB for informing that the resources for the handover have been prepared at the target gNB.

In one example, a third measurement is a number of failed handover preparations. This measurement can provide the number of failed handover preparations received by the source gNB via the Xn interface. This measurement can be split into subcounters per failure cause. Further, the third measurement can be on receipt of a HANDOVER PREPARATION FAILURE message by the source gNB from the target gNB for informing that the preparation of resources at the target gNB has failed. Each received HANDOVER PREPARATION FAILURE message can increment the relevant subcounter per failure cause by 1. Further, each subcounter is an integer value, where the cause identifies the failure cause of the handover preparations.

In one example, a fourth measurement is a number of requested handover resource allocations. This measurement can provide the number of handover resource allocation requests received by the target gNB via the Xn interface. Further, the fourth measurement can be on receipt of a HANDOVER REQUEST message by the target gNB from the source gNB for requesting the preparation of resources.

In one example, a fifth measurement is a number of successful handover resource allocations. This measurement can provide the number of successful handover resource allocations at the target gNB for the handover via the Xn interface. Further, the fifth measurement can be on transmission of a HANDOVER REQUEST ACKNOWLEDGE message by the target gNB to the source gNB for informing that the resources for the handover have been prepared.

In one example, a sixth measurement is a number of failed handover resource allocations. This measurement can provide the number of failed handover resource allocations at the target gNB for the handover via the Xn interface. This measurement can be split into subcounters per failure cause. Further, the sixth measurement can be on transmission of a HANDOVER PREPARATION FAILURE message by the target gNB to the source gNB for informing that the preparation of resources has failed. Each transmitted HANDOVER PREPARATION FAILURE message can increment the relevant subcounter per failure cause by 1. Further, each subcounter is an integer value, and where the cause identifies the failure cause of the handover resource allocations.

In one example, the measurements described herein can include or be associated with a CC, a single integer value, a NR cell CU, and SGS. Further, the measurements described herein can be a single integer value, and can be valid for packet switched traffic. Further, the measurements described can be used for performance assurance.

PDU Session Management

In one example, PDU session management can be associated with various measurements, such as a first measurement for a number of PDU sessions requested to setup, a second measurement for a number of PDU sessions successfully setup, and a third measurement for a number of PDU sessions failed to setup.

With respect to the first measurement for the number of PDU sessions requested to setup, this measurement can provide the number of PDU Sessions requested to setup by a gNB. This measurement can be split into subcounters per 5QI for each NSI identifier (S-NSSAI). The first measurement can be on receipt of a PDU SESSION RESOURCE SETUP REQUEST message by the gNB from the AMF. Each PDU Session requested to setup can increment the relevant subcounter per 5G QoS Indicator (5QI) for each NSI identifier (S-NSSAI) by 1. Further, each subcounter is an integer value, and where the SNSSAI identifies the NSI, and 5QI identifies the 5QI.

With respect to the second measurement for the number of PDU sessions successfully setup, this measurement can provide the number of PDU Sessions successfully setup by a gNB. This measurement can be split into subcounters per 5QI for each NSI identifier (S-NSSAI). The second measurement can be on transmission of a PDU SESSION RESOURCE SETUP RESPONSE message containing the "PDU Session Resource Setup Response List" IE by the gNB to the AMF. Each PDU Session successfully setup can increment the relevant subcounter per 5QI for each NSI identifier (S-NSSAI) by 1. Further, the SNSSAI identifies the NSI, and 5QI identifies the 5QI.

With respect to the third measurement for the number of PDU sessions failed to setup, this measurement can provide the number of PDU Sessions failed to setup by a gNB. This measurement can be split into subcounters per failure cause. The third measurement can be on transmission of a PDU SESSION RESOURCE SETUP RESPONSE message containing the "PDU Session Resource Failed to Setup List" by the gNB to the AMF. Each PDU Session failed to setup can increment the relevant subcounter per failure cause by 1. Further, each subcounter is an integer value, and where the cause identifies the cause of the PDU sessions resource setup failure.

In one configuration, a service producer can obtain raw performance measurements from gNB(s), and generate performance measurements for the gNB(s) based on the raw performance measurements. The service producer can be located in a gNB.

In one example, the performance measurement can be related to inter-gNB handovers via an NG interface. In another example, the performance measurement can be related to inter-gNB handovers via an Xn interface.

In one example, the performance measurement can be a number of requested handover preparations, a number of successful handover preparations, a number of failed handover preparations, a number of requested handover resource allocations, a number of successful handover resource allocations or a number of failed handover resource allocations.

In one example, the performance measurement of the number of requested handover preparations is a cumulative counter (CC) which is incremented by 1 on transmission of a HANDOVER REQUIRED message by the gNB to an access management function (AMF). In another example, the performance measurement of the number of successful handover preparations is a cumulative counter (CC) which is incremented by 1 on receipt of a HANDOVER COMMAND message by the gNB from the AMF. In yet another example, the performance measurement of the number of failed handover preparations is split into subcounters per failure cause and the subcounter is a cumulative counter (CC) and incremented by 1 on receipt of a HANDOVER PREPARATION FAILURE message with a corresponding cause by the gNB from the AMF. In a further example, the performance measurement of the number of requested handover resource allocations is a cumulative counter (CC) which is incremented by 1 on receipt of a HANDOVER REQUEST message by the gNB from the AMF. In yet a further example, the performance measurement of the number of successful handover resource allocations is a cumulative counter (CC) which is incremented by 1 on transmission of a HANDOVER REQUEST ACKNOWLEDGE message by the gNB to the AMF. In yet another further example, the performance measurement of the number of failed handover resource allocations is split into subcounters per failure cause and the subcounter is a cumulative counter (CC) and incremented by 1 on transmission of a HANDOVER FAILURE message with the corresponding cause by the gNB to the AMF.

In one example, the performance measurement of the number of requested handover preparations is a cumulative counter (CC) which is incremented by 1 on transmission of HANDOVER REQUEST message by a source gNB to a target gNB. In another example, the performance measurement of the number of successful handover preparations is a cumulative counter (CC) which is incremented by 1 on receipt of HANDOVER REQUEST ACKNOWLEDGE message by the source gNB from the target gNB. In yet another example, the performance measurement of the number of failed handover preparations is split into subcounters per failure cause and the subcounter is a cumulative counter (CC) and incremented by 1 on receipt of a HANDOVER PREPARATION FAILURE message with the corresponding cause by the source gNB from the target gNB. In a further example, the performance measurement of the number of requested handover resource allocations is a cumulative counter (CC) which is incremented by 1 on receipt of a HANDOVER REQUEST message by the target gNB from the source gNB. In yet a further example, the performance measurement of the number of successful handover resource allocations is a cumulative counter (CC) which is incremented by 1 on transmission of a HANDOVER REQUEST ACKNOWLEDGE message by the target gNB to the source gNB. In yet another further example, the performance measurement of the number of failed handover resource allocations is split into subcounters per failure cause and the subcounter is a cumulative counter (CC) and incremented by 1 on transmission of a HANDOVER PREPARATION FAILURE message with the corresponding cause by the target gNB to the source gNB.

In one example, the performance measurement can be related to a PDU session resource setup. In another example, the performance measurement can be a number of PDU sessions requested to setup, a number of PDU sessions successfully setup or a number of PDU sessions failed to setup.

In one example, the performance measurement of the number of PDU sessions requested to setup is a cumulative counter (CC) which is incremented by 1 for each PDU session requested to setup when receiving a PDU SESSION RESOURCE SETUP REQUEST message by the gNB from the AMF. In another example, the performance measurement of the number of PDU sessions successfully setup is a cumulative counter (CC) which is incremented by 1 for each PDU session contained in a "PDU Session Resource Setup Response List" information element (IE) when transmitting a PDU SESSION RESOURCE SETUP RESPONSE message by the gNB to the AMF. In yet another example, the performance measurement of the number of PDU sessions failed to setup is a cumulative counter (CC) which is increased by 1 for each PDU session contained in a "PDU Session Resource Failed to Setup List" IE when transmitting a PDU SESSION RESOURCE SETUP RESPONSE message by the gNB to the AMF.

In one example, the performance measurement of the PDU sessions requested to setup and the performance measurement of the number of PDU sessions successfully setup are split into subcounter per 5QI for each network slice instance (NSI) identifier. As an example, the NSI identifier can be single network slice selection assistance information (S-NSSAI). In another example, the performance measurement of the PDU sessions failed to setup is split into subcounters per failure cause indicated in a PDU SESSION RESOURCE SETUP RESPONSE message.

Figure 4:
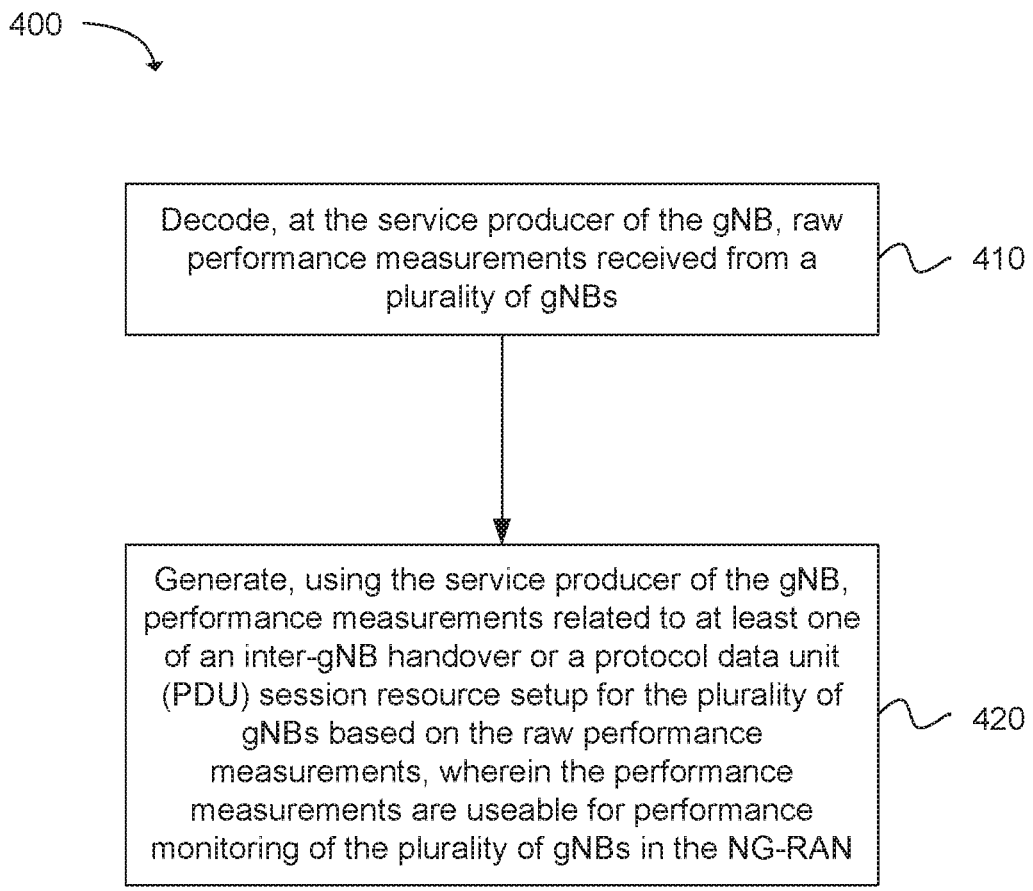
FIG. 4 depicts functionality of a service producer of a Next Generation NodeB (gNB) operable to generate performance measurements in a Next Generation radio access network (NG-RAN) in accordance with an example.

Another example provides functionality 400 of a service producer of a Next Generation NodeB (gNB) operable to generate performance measurements in a Next Generation radio access network (NG-RAN), as shown in FIG. 4. The service producer of the gNB can comprise one or more processors configured to decode raw performance measurements received from a plurality of gNBs, as in block 410. The service producer of the gNB can comprise one or more processors configured to generate performance measurements related to at least one of an inter-gNB handover or a protocol data unit (PDU) session resource setup for the plurality of gNBs based on the raw performance measurements, wherein the performance measurements are useable for performance monitoring of the plurality of gNBs in the NG-RAN, as in block 420. In addition, the gNB can comprise a memory interface configured to send to a memory the performance measurements.

Figure 5:
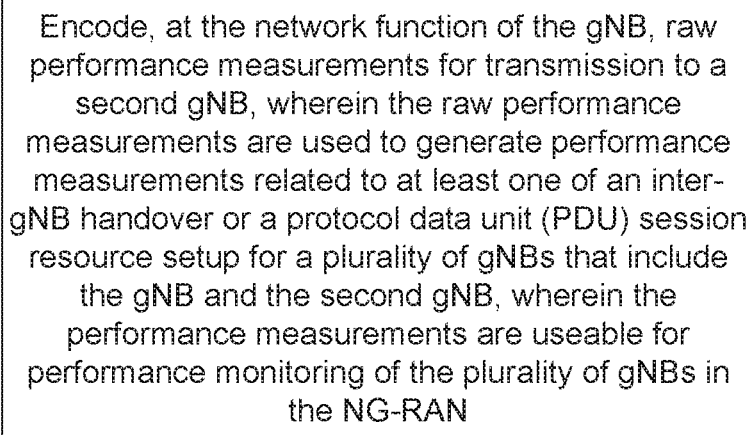
FIG. 5 depicts functionality of a network function of a Next Generation NodeB (gNB) in a Next Generation radio access network (NG-RAN) in accordance with an example.

Another example provides functionality 500 of a network function of a Next Generation NodeB (gNB) in a Next Generation radio access network (NG-RAN), as shown in FIG. 5. The gNB can comprise one or more processors configured to encode, at the network function of the gNB, raw performance measurements for transmission to a second gNB, wherein the raw performance measurements are used to generate performance measurements related to at least one of an inter-gNB handover or a protocol data unit (PDU) session resource setup for a plurality of gNBs that include the gNB and the second gNB, wherein the performance measurements are useable for performance monitoring of the plurality of gNBs in the NG-RAN, as in block 510. In addition, the gNB can comprise a memory interface configured to retrieve from a memory the raw performance measurements.

Figure 6:
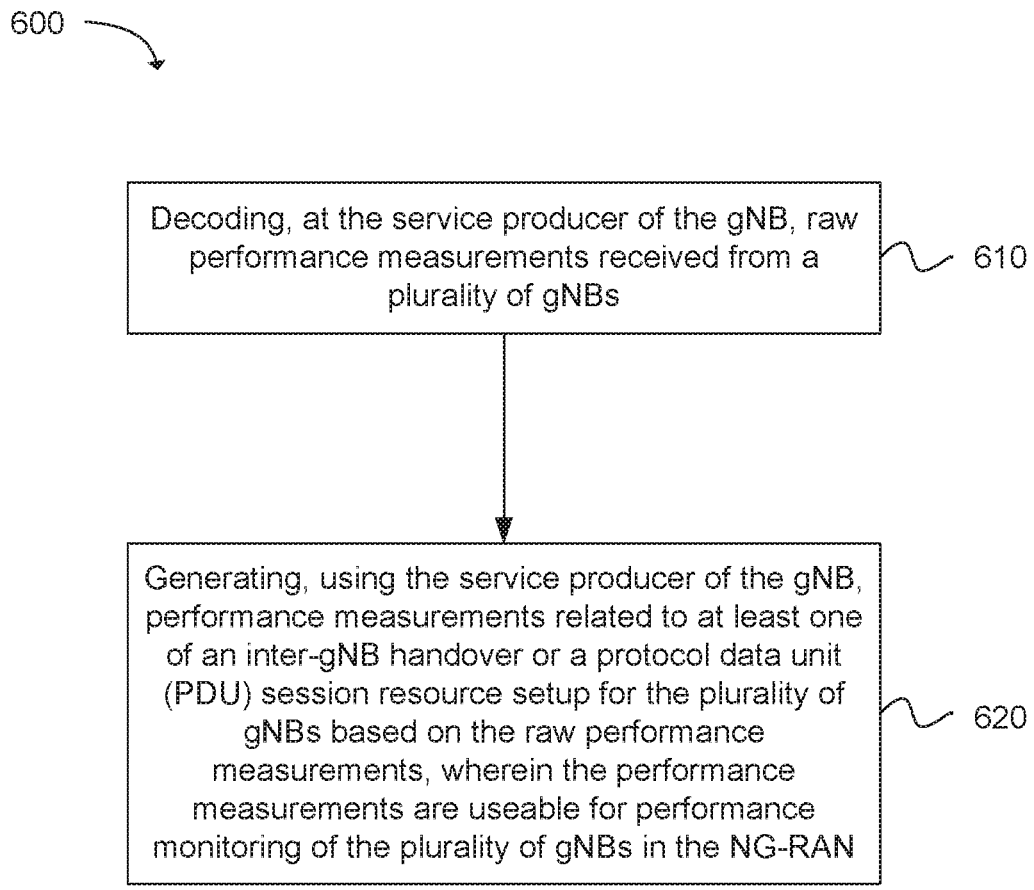
FIG. 6 depicts a flowchart of a machine readable storage medium having instructions embodied thereon for generating performance measurements in a Next Generation radio access network (NG-RAN) in accordance with an example.

Another example provides at least one machine readable storage medium having instructions 600 embodied thereon for generating performance measurements in a Next Generation radio access network (NG-RAN), as shown in FIG. 6. The instructions can be executed on a machine, where the instructions are included on at least one computer readable medium or one non-transitory machine readable storage medium. The instructions when executed by one or more processors of a at a service producer of a Next Generation NodeB (gNB) perform: decoding, at the service producer of the gNB, raw performance measurements received from a plurality of gNBs, as in block 610. The instructions when executed by the one or more processors perform: generating, using the service producer of the gNB, performance measurements related to at least one of an inter-gNB handover or a protocol data unit (PDU) session resource setup for the plurality of gNBs based on the raw performance measurements, wherein the performance measurements are useable for performance monitoring of the plurality of gNBs in the NG-RAN, as in block 620.

Figure 7:
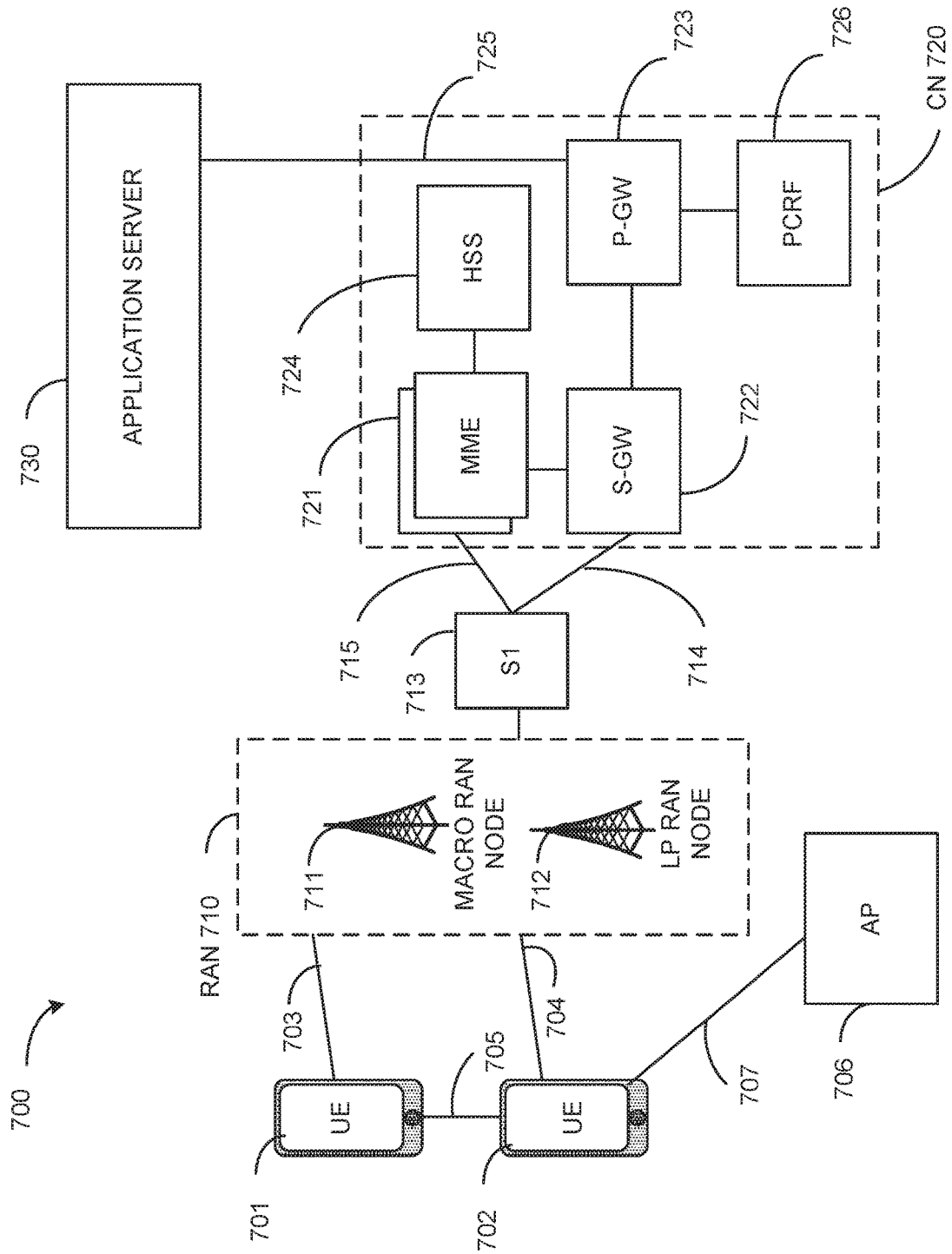
FIG. 7 illustrates an architecture of a wireless network in accordance with an example.

FIG. 7 illustrates an architecture of a system 700 of a network in accordance with some embodiments. The system 700 is shown to include a user equipment (UE) 701 and a UE 702. The UEs 701 and 702 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 701 and 702 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 and 702 may be configured to connect, e.g., communicatively couple, with a radio access network (RAN) 710—the RAN 710 may be, for example, an Evolved Universal Mobile Telecommunications System (UMTS) Terrestrial Radio Access Network (E-UTRAN), a NextGen RAN (NG RAN), or some other type of RAN. The UEs 701 and 702 utilize connections 703 and 704, respectively, each of which comprises a physical communications interface or layer (discussed in further detail below); in this example, the connections 703 and 704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 701 and 702 may further directly exchange communication data via a ProSe interface 705. The ProSe interface 705 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 702 is shown to be configured to access an access point (AP) 706 via connection 707. The connection 707 can comprise a local wireless connection, such as a connection consistent with any IEEE 802.15 protocol, wherein the AP 706 would comprise a wireless fidelity (WiFi®) router. In this example, the AP 706 is shown to be connected to the Internet without connecting to the core network of the wireless system (described in further detail below).

The RAN 710 can include one or more access nodes that enable the connections 703 and 704. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 710 may include one or more RAN nodes for providing macrocells, e.g., macro RAN node 711, and one or more RAN nodes for providing femtocells or picocells (e.g., cells having smaller coverage areas, smaller user capacity, or higher bandwidth compared to macrocells), e.g., low power (LP) RAN node 712.

Any of the RAN nodes 711 and 712 can terminate the air interface protocol and can be the first point of contact for the UEs 701 and 702. In some embodiments, any of the RAN nodes 711 and 712 can fulfill various logical functions for the RAN 710 including, but not limited to, radio network controller (RNC) functions such as radio bearer management, uplink and downlink dynamic radio resource management and data packet scheduling, and mobility management.

In accordance with some embodiments, the UEs 701 and 702 can be configured to communicate using Orthogonal Frequency-Division Multiplexing (OFDM) communication signals with each other or with any of the RAN nodes 711 and 712 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 and 712 to the UEs 701 and 702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 701 and 702. The physical downlink control channel (PDCCH) may carry information about the transport format and resource allocations related to the PDSCH channel, among other things. It may also inform the UEs 701 and 702 about the transport format, resource allocation, and H-ARQ (Hybrid Automatic Repeat Request) information related to the uplink shared channel. Typically, downlink scheduling (assigning control and shared channel resource blocks to the UE 702 within a cell) may be performed at any of the RAN nodes 711 and 712 based on channel quality information fed back from any of the UEs 701 and 702. The downlink resource assignment information may be sent on the PDCCH used for (e.g., assigned to) each of the UEs 701 and 702.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 710 is shown to be communicatively coupled to a core network (CN) 720—via an S1 interface 713. In embodiments, the CN 720 may be an evolved packet core (EPC) network, a NextGen Packet Core (NPC) network, or some other type of CN. In this embodiment the S1 interface 713 is split into two parts: the S1-U interface 714, which carries traffic data between the RAN nodes 711 and 712 and the serving gateway (S-GW) 722, and the S1-mobility management entity (MME) interface 715, which is a signaling interface between the RAN nodes 711 and 712 and MMEs 721.

In this embodiment, the CN 720 comprises the MMEs 721, the S-GW 722, the Packet Data Network (PDN) Gateway (P-GW) 723, and a home subscriber server (HSS) 724. The MMEs 721 may be similar in function to the control plane of legacy Serving General Packet Radio Service (GPRS) Support Nodes (SGSN). The MMEs 721 may manage mobility aspects in access such as gateway selection and tracking area list management. The HSS 724 may comprise a database for network users, including subscription-related information to support the network entities' handling of communication sessions. The CN 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc.

The S-GW 722 may terminate the S1 interface 713 towards the RAN 710, and routes data packets between the RAN 710 and the CN 720. In addition, the S-GW 722 may be a local mobility anchor point for inter-RAN node handovers and also may provide an anchor for inter-3GPP mobility. Other responsibilities may include lawful intercept, charging, and some policy enforcement.

The P-GW 723 may terminate an SGi interface toward a PDN. The P-GW 723 may route data packets between the EPC network 723 and external networks such as a network including the application server 730 (alternatively referred to as application function (AF)) via an Internet Protocol (IP) interface 725. Generally, the application server 730 may be an element offering applications that use IP bearer resources with the core network (e.g., UMTS Packet Services (PS) domain, LTE PS data services, etc.). In this embodiment, the P-GW 723 is shown to be communicatively coupled to an application server 730 via an IP communications interface 725. The application server 730 can also be configured to support one or more communication services (e.g., Voice-over-Internet Protocol (VoIP) sessions, PTT sessions, group communication sessions, social networking services, etc.) for the UEs 701 and 702 via the CN 720.

The P-GW 723 may further be a node for policy enforcement and charging data collection. Policy and Charging Enforcement Function (PCRF) 726 is the policy and charging control element of the CN 720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate Quality of Service (QoS) and charging parameters. The PCRF 726 may provision this rule into a Policy and Charging Enforcement Function (PCEF) (not shown) with the appropriate traffic flow template (TFT) and QoS class of identifier (QCI), which commences the QoS and charging as specified by the application server 730.

Figure 8:
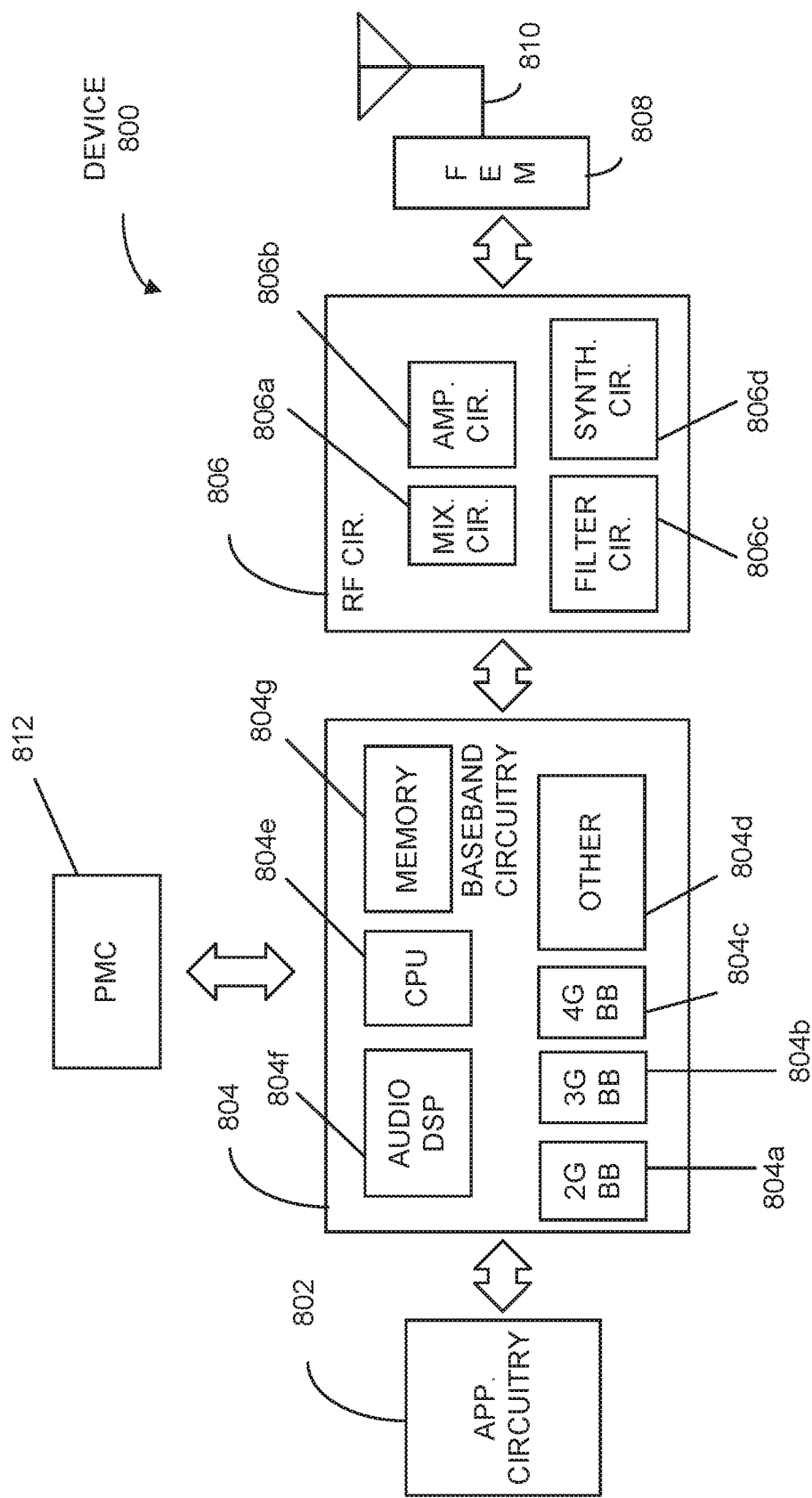
FIG. 8 illustrates a diagram of a wireless device (e.g., UE) in accordance with an example.

FIG. 8 illustrates example components of a device 800 in accordance with some embodiments. In some embodiments, the device 800 may include application circuitry 802, baseband circuitry 804, Radio Frequency (RF) circuitry 806, front-end module (FEM) circuitry 808, one or more antennas 810, and power management circuitry (PMC) 812 coupled together at least as shown. The components of the illustrated device 800 may be included in a UE or a RAN node. In some embodiments, the device 800 may include less elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. Baseband circuitry 804 may interface with the application circuitry 802 for generation and processing of the baseband signals and for controlling operations of the RF circuitry 806. For example, in some embodiments, the baseband circuitry 804 may include a third generation (3G) baseband processor 804a, a fourth generation (4G) baseband processor 804b, a fifth generation (5G) baseband processor 804c, or other baseband processor(s) 804d for other existing generations, generations in development or to be developed in the future (e.g., second generation (2G), sixth generation (6G), etc.). The baseband circuitry 804 (e.g., one or more of baseband processors 804a-d) may handle various radio control functions that enable communication with one or more radio networks via the RF circuitry 806. In other embodiments, some or all of the functionality of baseband processors 804a-d may be included in modules stored in the memory 804g and executed via a Central Processing Unit (CPU) 804e. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include one or more audio digital signal processor(s) (DSP) 804f. The audio DSP(s) 804f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 804 or the application circuitry 802 depending on the desired output frequency. In some embodiments, a divider control input (e.g., N) may be determined from a look-up table based on a channel indicated by the application circuitry 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810. In various embodiments, the amplification through the transmit or receive signal paths may be done solely in the RF circuitry 806, solely in the FEM circuitry 808, or in both the RF circuitry 806 and the FEM circuitry 808.

In some embodiments, the FEM circuitry 808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device is included in a UE. The PMC 812 may increase the power conversion efficiency while providing desirable implementation size and heat dissipation characteristics.

While FIG. 8 shows the PMC 812 coupled only with the baseband circuitry 804. However, in other embodiments, the PMC 812 may be additionally or alternatively coupled with, and perform similar power management operations for, other components such as, but not limited to, application circuitry 802, RF circuitry 806, or FEM circuitry 808.

In some embodiments, the PMC 812 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used execute Layer 3, Layer 2, or Layer 1 functionality, while processors of the application circuitry 802 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
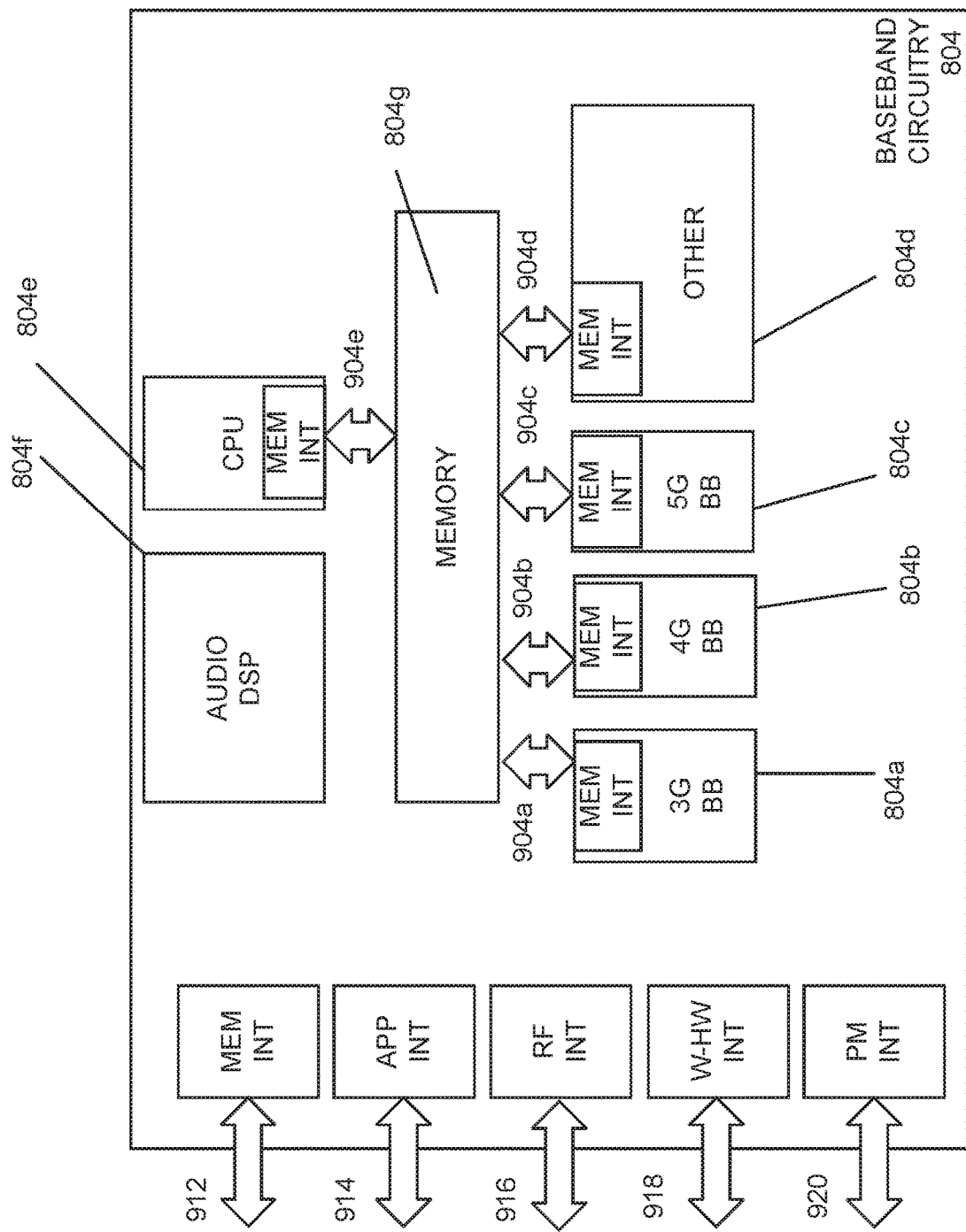
FIG. 9 illustrates interfaces of baseband circuitry in accordance with an example.

FIG. 9 illustrates example interfaces of baseband circuitry in accordance with some embodiments. As discussed above, the baseband circuitry 804 of FIG. 8 may comprise processors 804a-804e and a memory 804g utilized by said processors. Each of the processors 804a-804e may include a memory interface, 904a-904e, respectively, to send/receive data to/from the memory 804g.

The baseband circuitry 804 may further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application circuitry 802 of FIG. 8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812.

Figure 10:
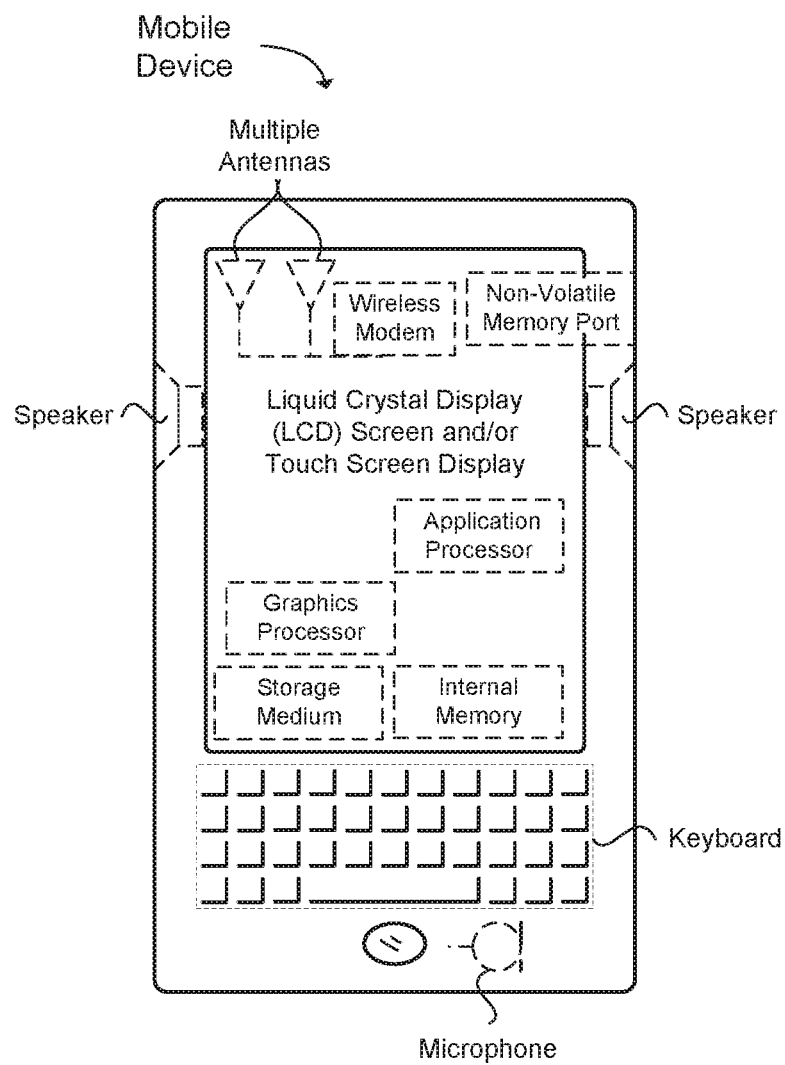
FIG. 10 illustrates a diagram of a wireless device (e.g., UE) in accordance with an example.

FIG. 10 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 10 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Examples

The following examples pertain to specific technology embodiments and point out specific features, elements, or actions that can be used or otherwise combined in achieving such embodiments.

Example 1 includes an apparatus of a service producer of a Next Generation NodeB (gNB) operable to generate performance measurements in a Next Generation radio access network (NG-RAN), the apparatus comprising: one or more processors configured to: decode, at the service producer of the gNB, raw performance measurements received from a plurality of gNBs; generate, using the service producer of the gNB, performance measurements related to at least one of an inter-gNB handover or a protocol data unit (PDU) session resource setup for the plurality of gNBs based on the raw performance measurements, wherein the performance measurements are useable for performance monitoring of the plurality of gNBs in the NG-RAN; and a memory interface configured to send to a memory the performance measurements.

Example 2 includes the apparatus of Example 1, further comprising a transceiver configured to: receive the raw performance measurements; and transmit the performance measurements to a service consumer.

Example 3 includes the apparatus of any of Examples 1 to 2, wherein the performance measurements include at least one of: a number of requested handover preparations, a number of successful handover preparations, a number of failed handover preparations, a number of requested handover resource allocations, a number of successful handover resource allocations, or a number of failed handover resource allocations.

Example 4 includes the apparatus of any of Examples 1 to 3, wherein: the performance measurement corresponding to the number of requested handover preparations is a cumulative counter (CC) which is incremented by 1 on transmission of a handover required message from the gNB to an access management function (AMF) in the NG-RAN; the performance measurement corresponding to the number of successful handover preparations is a CC which is incremented by 1 on receipt of a handover command message at the gNB from the AMF; the performance measurement corresponding to the number of failed handover preparations is split into subcounters per failure cause and the subcounter is a CC and incremented by 1 on receipt of a handover preparation failure message with the corresponding cause at the gNB from AMF; the performance measurement corresponding to the number of requested handover resource allocations is a CC which is incremented by 1 on receipt of a handover request message at the gNB from the AMF; the performance measurement corresponding to the number of successful handover resource allocations is a CC which is incremented by 1 on transmission of a handover request acknowledge message from the gNB to the AMF; or the performance measurement corresponding to the number of failed handover resource allocations is split into subcounters per failure cause and the subcounter is a CC and incremented by 1 on transmission of a handover failure message with the corresponding cause from the gNB to the AMF.

Example 5 includes the apparatus of any of Examples 1 to 4, wherein the performance measurements include at least one of: a number of PDU sessions requested to setup, a number of PDU sessions successfully setup, or a number of PDU sessions failed to setup.

Example 6 includes the apparatus of any of Examples 1 to 5, wherein: the performance measurement corresponding to the number of number of PDU sessions requested to setup is a cumulative counter (CC) which is incremented by 1 for each PDU session requested to setup when receiving a PDU session resource setup request message at the gNB from an access management function (AMF) in the NG-RAN; the performance measurement corresponding to the number of PDU sessions successfully setup is a CC which is incremented by 1 for each PDU session contained in a "PDU session resource setup response list" information element (IE) when transmitting a PDU session resource setup response message from the gNB to the AMF; or the performance measurement corresponding to the number of PDU sessions failed to setup is a CC which is increased by 1 for each PDU session contained in a "PDU session resource failed to setup list" IE when transmitting the PDU session resource setup response message from the gNB to the AMF.

Example 7 includes the apparatus of any of Examples 1 to 6, wherein: the performance measurement corresponding to the PDU sessions requested to setup and the performance measurement corresponding to the number of PDU sessions successfully setup are split into subcounter per Fifth Generation (5G) quality of service (QoS) Indicator (5QI) for each network slice instance (NSI) identifier.

Example 8 includes the apparatus of any of Examples 1 to 7, wherein the NSI identifier is included in single network slice selection assistance information (S-NSSAI).

Example 9 includes the apparatus of any of Examples 1 to 8, wherein the inter-gNB handover is via an NG interface or an Xn interface.

Example 10 includes an apparatus of a network function of a Next Generation NodeB (gNB) in a Next Generation radio access network (NG-RAN), the apparatus comprising: one or more processors configured to: encode, at the network function of the gNB, raw performance measurements for transmission to a second gNB, wherein the raw performance measurements are used to generate performance measurements related to at least one of an inter-gNB handover or a protocol data unit (PDU) session resource setup for a plurality of gNBs, wherein the performance measurements are useable for performance monitoring of the plurality of gNBs in the NG-RAN; a memory interface configured to retrieve from a memory the raw performance measurements.

Example 11 includes the apparatus of Example 10, wherein the performance measurements include at least one of: a number of requested handover preparations, a number of successful handover preparations, a number of failed handover preparations, a number of requested handover resource allocations, a number of successful handover resource allocations, or a number of failed handover resource allocations.

Example 12 includes the apparatus of any of Examples 10 to 11, wherein: the performance measurement corresponding to the number of requested handover preparations is a cumulative counter (CC) which is incremented by 1 on transmission of a handover required message from the second gNB to an access management function (AMF) in the NG-RAN; the performance measurement corresponding to the number of successful handover preparations is a CC which is incremented by 1 on receipt of a handover command message at the second gNB from the AMF; the performance measurement corresponding to the number of failed handover preparations is split into subcounters per failure cause and the subcounter is a CC and incremented by 1 on receipt of a handover preparation failure message with the corresponding cause at the second gNB from AMF; the performance measurement corresponding to the number of requested handover resource allocations is a CC which is incremented by 1 on receipt of a handover request message at the second gNB from the AMF; the performance measurement corresponding to the number of successful handover resource allocations is a CC which is incremented by 1 on transmission of a handover request acknowledge message from the second gNB to the AMF; or the performance measurement corresponding to the number of failed handover resource allocations is split into subcounters per failure cause and the subcounter is a CC and incremented by 1 on transmission of a handover failure message with the corresponding cause from the second gNB to the AMF.

Example 13 includes the apparatus of any of Examples 10 to 12, wherein the performance measurements include at least one of: a number of PDU sessions requested to setup, a number of PDU sessions successfully setup, or a number of PDU sessions failed to setup.

Example 14 includes the apparatus of any of Examples 10 to 13, wherein: the performance measurement corresponding to the number of PDU sessions requested to setup is a cumulative counter (CC) which is incremented by 1 for each PDU session requested to setup when receiving a PDU session resource setup request message at the second gNB from an access management function (AMF) in the NG- RAN; the performance measurement corresponding to the number of PDU sessions successfully setup is a CC which is incremented by 1 for each PDU session contained in a "PDU session resource setup response list" information element (IE) when transmitting a PDU session resource setup response message from the second gNB to the AMF; or the performance measurement corresponding to the number of PDU sessions failed to setup is a CC which is increased by 1 for each PDU session contained in a "PDU session resource failed to setup list" IE when transmitting the PDU session resource setup response message from the second gNB to the AMF.

Example 15 includes the apparatus of any of Examples 10 to 14, wherein: the performance measurement corresponding to the PDU sessions requested to setup and the performance measurement corresponding to the number of PDU sessions successfully setup are split into subcounter per Fifth Generation (5G) quality of service (QoS) Indicator (5QI) for each network slice instance (NSI) identifier, wherein the NSI identifier is included in single network slice selection assistance information (S-NSSAI).

Example 16 includes at least one machine readable storage medium having instructions embodied thereon for generating performance measurements in a Next Generation radio access network (NG-RAN), the instructions when executed by one or more processors at a service producer of a Next Generation NodeB (gNB) perform the following: decoding, at the service producer of the gNB, raw performance measurements received from a plurality of gNBs; generating, using the service producer of the gNB, performance measurements related to at least one of an inter-gNB handover or a protocol data unit (PDU) session resource setup for the plurality of gNBs based on the raw performance measurements, wherein the performance measurements are useable for performance monitoring of the plurality of gNBs in the NG-RAN.

Example 17 includes the at least one machine readable storage medium of Example 16, wherein the performance measurements include at least one of: a number of requested handover preparations, a number of successful handover preparations, a number of failed handover preparations, a number of requested handover resource allocations, a number of successful handover resource allocations, or a number of failed handover resource allocations.

Example 18 includes the at least one machine readable storage medium of any of Examples 16 to 17, wherein: the performance measurement corresponding to the number of requested handover preparations is a cumulative counter (CC) which is incremented by 1 on transmission of a handover required message from the gNB to an access management function (AMF) in the NG-RAN; the performance measurement corresponding to the number of successful handover preparations is a CC which is incremented by 1 on receipt of a handover command message at the gNB from the AMF; the performance measurement corresponding to the number of failed handover preparations is split into subcounters per failure cause and the subcounter is a CC and incremented by 1 on receipt of a handover preparation failure message with the corresponding cause at the gNB from AMF; the performance measurement corresponding to the number of requested handover resource allocations is a CC which is incremented by 1 on receipt of a handover request message at the gNB from the AMF; the performance measurement corresponding to the number of successful handover resource allocations is a CC which is incremented by 1 on transmission of a handover request acknowledge message from the gNB to the AMF; or the performance measurement corresponding to the number of failed handover resource allocations is split into subcounters per failure cause and the subcounter is a CC and incremented by 1 on transmission of a handover failure message with the corresponding cause from the gNB to the AMF.

Example 19 includes the at least one machine readable storage medium of any of Examples 16 to 18, wherein the performance measurements include at least one of: a number of PDU sessions requested to setup, a number of PDU sessions successfully setup, or a number of PDU sessions failed to setup.

Example 20 includes the at least one machine readable storage medium of any of Examples 16 to 19, wherein: the performance measurement corresponding to the number of PDU sessions requested to setup is a cumulative counter (CC) which is incremented by 1 for each PDU session requested to setup when receiving a PDU session resource setup request message at the gNB from an access management function (AMF) in the NG-RAN; the performance measurement corresponding to the number of PDU sessions successfully setup is a CC which is incremented by 1 for each PDU session contained in a "PDU session resource setup response list" information element (IE) when transmitting a PDU session resource setup response message from the gNB to the AMF; or the performance measurement corresponding to the number of PDU sessions failed to setup is a CC which is increased by 1 for each PDU session contained in a "PDU session resource failed to setup list" IE when transmitting the PDU session resource setup response message from the gNB to the AMF Example 21 includes the at least one machine readable storage medium of any of Examples 16 to 20, wherein: the performance measurement corresponding to the PDU sessions requested to setup and the performance measurement corresponding to the number of PDU sessions successfully setup are split into subcounter per Fifth Generation (5G) quality of service (QoS) Indicator (5QI) for each network slice instance (NSI) identifier, wherein the NSI identifier is included in single network slice selection assistance information (S-NSSAI).

Example 22 includes the at least one machine readable storage medium of any of Examples 16 to 21, wherein the inter-gNB handover is via an NG interface or an Xn interface.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. An apparatus of a service producer of a base station in a radio access network (RAN), the apparatus comprising:
  one or more processors configured to:
    decode, at the service producer of the base station, raw performance measurements received from a plurality of base stations; and
    generate, using the service producer of the base station, performance measurements related to at least one of an inter-base station handover or a protocol data unit (PDU) session resource setup for the plurality of base stations based on the raw performance measurements, wherein:
      the performance measurements are useable for performance monitoring of the plurality of base stations in the RAN;
      the performance measurements include a number of successful handover preparations; and
      the performance measurement corresponding to the number of successful handover preparations is a cumulative counter (CC) which is incremented by 1 on receipt of a handover command message at the base station from an access management function (AMF); and
  a memory interface configured to send to a memory the performance measurements.

2. The apparatus of claim 1, further comprising a transceiver configured to:
  receive the raw performance measurements; and
  transmit the performance measurements to a service consumer.

3. The apparatus of claim 1, wherein the performance measurements further include at least one of: a number of requested handover preparations, a number of failed handover preparations, a number of requested handover resource allocations, a number of successful handover resource allocations, or a number of failed handover resource allocations.

4. The apparatus of claim 3, wherein:
the performance measurement corresponding to the number of requested handover preparations is included in the performance measurements and is a cumulative counter (CC) which is incremented by 1 on transmission of a handover required message from the base station to the AMF;
the performance measurement corresponding to the number of failed handover preparations is included in the performance measurements and is split into subcounters per failure cause incremented by 1 on receipt of a handover preparation failure message with a corresponding cause at the base station from the AMF;
the performance measurement corresponding to the number of requested handover resource allocations is included in the performance measurements and is a CC which is incremented by 1 on receipt of a handover request message at the base station from the AMF;
the performance measurement corresponding to the number of successful handover resource allocations is included in the performance measurements and is a CC which is incremented by 1 on transmission of a handover request acknowledge message from the base station to the AMF; or
the performance measurement corresponding to the number of failed handover resource allocations is included in the performance measurements and is split into subcounters per failure cause incremented by 1 on transmission of a handover failure message with the corresponding cause from the base station to the AMF.

5. The apparatus of claim 1, wherein the performance measurements further include at least one of: a number of PDU sessions requested to setup, a number of PDU sessions successfully setup, or a number of PDU sessions failed to setup.

6. The apparatus of claim 5, wherein:
the performance measurement corresponding to the number of PDU sessions requested to setup is included in the performance measurements and is a CC which is incremented by 1 for each PDU session requested to setup when receiving a PDU session resource setup request message at the base station from the AMF in the RAN;
the performance measurement corresponding to the number of PDU sessions successfully setup is included in the performance measurements and is a CC which is incremented by 1 for each PDU session contained in a "PDU session resource setup response list" information element (IE) when transmitting a PDU session resource setup response message from the base station to the AMF; or
the performance measurement corresponding to the number of PDU sessions failed to setup is included in the performance measurements and is a CC which is increased by 1 for each PDU session contained in a "PDU session resource failed to setup list" IE when transmitting the PDU session resource setup response message from the base station to the AMF.

7. The apparatus of claim 5, wherein:
the performance measurement corresponding to the PDU sessions requested to setup and the performance measurement corresponding to the number of PDU sessions successfully setup are included in the performance measurements and are split into subcounter per Fifth Generation (5G) quality of service (QoS) Indicator (5QI) for each network slice instance (NSI) identifier.

8. The apparatus of claim 7, wherein the NSI identifier is included in single network slice selection assistance information (S-NSSAI).

9. The apparatus of claim 1, wherein the inter-base station handover is via an NG interface or an Xn interface.

10. An apparatus of a network function of a base station in a radio access network (RAN), the apparatus comprising:
one or more processors configured to:
encode, at the network function of the base station, raw performance measurements for transmission to a second base station, wherein the raw performance measurements are used to generate performance measurements related to at least one of an inter-base station handover or a protocol data unit (PDU) session resource setup for a plurality of base stations that include the base station and the second base station, wherein:
the performance measurements are useable for performance monitoring of the plurality of base stations in the RAN;
the performance measurements include a number of successful handover preparations; and
the performance measurement corresponding to the number of successful handover preparations is a cumulative counter (CC) which is incremented by 1 on receipt of a handover command message at the second base station from an access management function (AMF); and
a memory interface configured to retrieve from a memory the raw performance measurements.

11. The apparatus of claim 10, wherein the performance measurements further include at least one of: a number of requested handover preparations, a number of failed handover preparations, a number of requested handover resource allocations, a number of successful handover resource allocations, or a number of failed handover resource allocations.

12. The apparatus of claim 11, wherein:
the performance measurement corresponding to the number of requested handover preparations is included in the performance measurements and is a CC which is incremented by 1 on transmission of a handover required message from the second base station to the AMF;
the performance measurement corresponding to the number of failed handover preparations is included in the performance measurements and is split into subcounters per failure cause incremented by 1 on receipt of a handover preparation failure message with a corresponding cause at the second base station from the AMF;
the performance measurement corresponding to the number of requested handover resource allocations is included in the performance measurements and is a CC which is incremented by 1 on receipt of a handover request message at the second base station from the AMF;
the performance measurement corresponding to the number of successful handover resource allocations is included in the performance measurements and is a CC which is incremented by 1 on transmission of a handover request acknowledge message from the second base station to the AMF; or the performance measurement corresponding to the number of failed handover resource allocations is included in the performance measurements and is split into subcounters per failure cause incremented by 1 on transmission of a handover failure message with the corresponding cause from the second base station to the AMF.

13. The apparatus of claim 10, wherein the performance measurements further include at least one of: a number of PDU sessions requested to setup, a number of PDU sessions successfully setup, or a number of PDU sessions failed to setup.

14. The apparatus of claim 13, wherein:
the performance measurement corresponding to the PDU sessions requested to setup and the performance measurement corresponding to the number of PDU sessions successfully setup are included in the performance measurements and are split into subcounter per Fifth Generation (5G) quality of service (QoS) Indicator (5QI) for each network slice instance (NSI) identifier, wherein the NSI identifier is included in single network slice selection assistance information (S-NSSAI).

15. At least one non-transitory machine readable storage medium having instructions embodied thereon, the instructions when executed by one or more processors at a service producer of a base station in a radio access network(RAN) perform the following:
decoding, at the service producer of the base station, raw performance measurements received from a plurality of base stations; and
generating, using the service producer of the base station, performance measurements related to at least one of an inter-base station handover or a protocol data unit (PDU) session resource setup for the plurality of base stations based on the raw performance measurements, wherein:
the performance measurements are useable for performance monitoring of the plurality of base stations in the RAN;
the performance measurements include at least one of: a number of requested handover preparations, a number of successful handover preparations; and
the performance measurement corresponding to the number of successful handover preparations is a cumulative counter (CC) which is incremented by 1 on receipt of a handover command message at the base station from an access management function (AMF).

16. The at least one non-transitory machine readable storage medium of claim 15, wherein the performance measurements further include at least one of: a number of requested handover preparations, number of failed handover preparations, a number of requested handover resource allocations, a number of successful handover resource allocations, or a number of failed handover resource allocations.

17. The at least one non-transitory machine readable storage medium of claim 15, wherein the performance measurements further include at least one of: a number of PDU sessions requested to setup, a number of PDU sessions successfully setup, or a number of PDU sessions failed to setup.

18. The at least one non-transitory machine readable storage medium of claim 17, wherein:
the performance measurement corresponding to the number of PDU sessions requested to setup is included in the performance measurements and is a CC which is incremented by 1 for each PDU session requested to setup when receiving a PDU session resource setup request message at the base station from the AMF;
the performance measurement corresponding to the number of PDU sessions successfully setup is included in the performance measurements and is a CC which is incremented by 1 for each PDU session contained in a "PDU session resource setup response list" information element (IE) when transmitting a PDU session resource setup response message from the base station to the AMF; or
the performance measurement corresponding to the number of PDU sessions failed to setup is included in the performance measurements and is a CC which is increased by 1 for each PDU session contained in a "PDU session resource failed to setup list" IE when transmitting the PDU session resource setup response message from the base station to the AMF.

19. The at least one non-transitory machine readable storage medium of claim 17, wherein:
the performance measurement corresponding to the PDU sessions requested to setup and the performance measurement corresponding to the number of PDU sessions successfully setup are included in the performance measurements and are split into subcounter per Fifth Generation (5G) quality of service (QoS) Indicator (5QI) for each network slice instance (NSI) identifier, wherein the NSI identifier is included in single network slice selection assistance information (S-NSSAI).

20. The at least one non-transitory machine readable storage medium of claim 15, wherein the inter-base station handover is via an NG interface or an Xn interface.

* * * * *